(12) United States Patent
Knight et al.

(10) Patent No.: US 8,412,819 B2
(45) Date of Patent: *Apr. 2, 2013

(54) DYNAMICALLY ENABLING FEATURES OF AN APPLICATION BASED ON USER STATUS

(75) Inventors: David Knight, Belmont, CA (US);
Jason Q. Zhang, San Jose, CA (US);
Steffen Matt, Campbell, CA (US);
Anand Ramanathan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,427

(22) Filed: May 21, 2012

(65) Prior Publication Data
US 2012/0226806 A1 Sep. 6, 2012

Related U.S. Application Data

(63) Continuation of application No. 12/260,862, filed on Oct. 29, 2008.

(51) Int. Cl.
*G06F 15/173* (2006.01)
(52) U.S. Cl. ...................................................... 709/224
(58) Field of Classification Search .................. 709/224
See application file for complete search history.

(56) References Cited

U.S. PATENT DOCUMENTS

| | | | |
|---|---|---|---|
| 7,042,995 B1 | 5/2006 | Praturi et al. | |
| 7,146,608 B1 | 12/2006 | Newman et al. | |
| 7,162,628 B2 | 1/2007 | Gentil et al. | |
| 7,236,966 B1 | 6/2007 | Jackson et al. | |
| 7,411,915 B1 | 8/2008 | Spain et al. | |
| 2004/0189712 A1* | 9/2004 | Rundell | 345/808 |
| 2004/0223599 A1* | 11/2004 | Bear et al. | 379/207.02 |
| 2004/0225679 A1 | 11/2004 | Oran | |
| 2005/0055412 A1* | 3/2005 | Kaminsky et al. | 709/207 |
| 2005/0201533 A1* | 9/2005 | Emam et al. | 379/88.19 |
| 2006/0004911 A1* | 1/2006 | Becker et al. | 709/207 |
| 2006/0085581 A1* | 4/2006 | Martin | 710/260 |
| 2006/0090169 A1* | 4/2006 | Daniels et al. | 719/320 |
| 2006/0251113 A1 | 11/2006 | Jagadeesan et al. | |
| 2007/0041566 A1 | 2/2007 | Praturi et al. | |
| 2007/0078905 A1* | 4/2007 | Gunther et al. | 707/201 |
| 2007/0136686 A1* | 6/2007 | Price et al. | 715/808 |
| 2007/0143454 A1 | 6/2007 | Ma et al. | |
| 2007/0150583 A1 | 6/2007 | Asthana et al. | |

(Continued)

OTHER PUBLICATIONS

U.S. Appl. No. 11/805,764, filed May 23, 2007, for Methods and Apparatus for Selectively Sharing a Portion of a Display During a Collaboration Session, by Defeng Lu., 42 pages.

*Primary Examiner* — Imad Hussain
(74) *Attorney, Agent, or Firm* — Cesari and McKenna, LLP (57) ABSTRACT

In one embodiment, a first application detects a user's activity. Based on the user's activity detected by the first application, a type of user status is determined from among a plurality of different types of possible user status. One or more features are determined of a feature set of a second application that correspond to the type of user status detected by the first application. The corresponding one or more features of the feature set of the second application are limited to prevent the one or more features from interrupting the user's activity. One or more other features of the feature set of the second application that do not correspond to the type of user status detected by the first application are permitted.

20 Claims, 4 Drawing Sheets

U.S. PATENT DOCUMENTS

| | | |
|---|---|---|
| 2007/0180152 A1 | 8/2007 | Montanez |
| 2008/0002820 A1* | 1/2008 | Shtiegman et al. ...... 379/211.02 |
| 2008/0034435 A1* | 2/2008 | Grabarnik et al. .............. 726/25 |
| 2008/0069318 A1* | 3/2008 | McClung ................... 379/88.22 |

* cited by examiner

DYNAMICALLY ENABLING FEATURES OF AN APPLICATION BASED ON USER STATUS

RELATED APPLICATIONS

This application for United States Patent is a continuation of U.S. patent application Ser. No. 12/260,862 filed on Oct. 29, 2008 by David Knight, et al., entitled "Dynamically Enabling Features of an Application Based on User Status", the contents of which are incorporated by reference herein in their entirety.

TECHNICAL FIELD

The present disclosure relates generally to computers, and, more particularly, to control of application feature sets on computers.

BACKGROUND

Computing devices, such as personal computers (PCs), smartphones, etc., are generally configured to execute applications for one or more purposes, such as document creation, communication, etc. For example, online collaborative computing sessions (meetings) are a type of application that allow users to share documents or applications with one another, such as by sharing a view of a desktop or one or more particular applications on the desktop of a presenter device with one or more attendee/viewer devices.

A user's status generally indicates a current online "situation" of the user, for instance, whether the user is available, busy, requesting to not be disturbed, etc.

Typically, this status is manually adjusted/selected by the user for the sole purpose of informing other users of the particular user's availability/situation. Certain systems may also dynamically adjust the status indicator based on activity of the user, e.g., to "busy" when engaged in an activity, or to "away from keyboard" if inactive for some period of time. However, these adjusted status indicators are solely to inform other users of the particular user's availability/situation.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, one or more applications may be executed on a computer, where each application has an associated feature set. A user status of a particular application may be determined, and in response to that user status for the particular application, the feature set of at least one other application may be dynamically adjusted. For example, if hosting an online collaboration session and sharing a desktop, email popups, instant messaging messages, and systems sounds may all be suppressed.

Description

Figure 1:
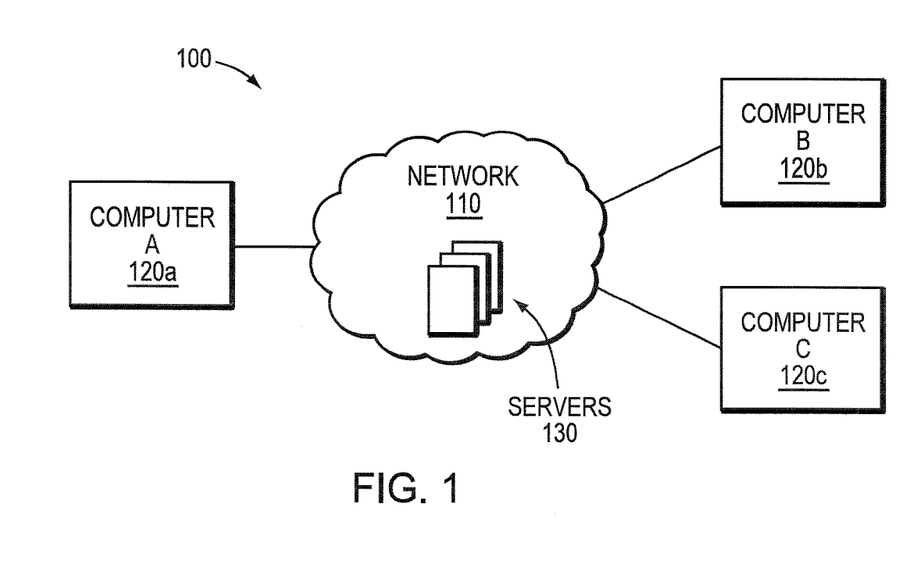
FIG. 1 illustrates an example computer network.

FIG. 1 is a schematic block diagram of an example computer network 100 illustratively comprising nodes/devices, such as one or more devices 120 and one or more interaction servers 130 interconnected by links/network 110 as shown and as described further herein. For instance, devices 120, e.g., participant devices as described below, may be a personal computer (PC) or one or more peripheral devices, such as phones, pagers, etc. Those skilled in the art will understand that any number of nodes, devices, links, etc. may be used in the computer network, and that the view shown herein is for simplicity.

In this environment, a number of participants may interact in an on-line, interactive, or collaborative setting. Such a setting can be for a meeting, training or education, support, or any other event that may require a number of participants to work together, interact, collaborate, or otherwise participate, such as web conferences, on-line meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 120 through the interaction server 130. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

In other words, a collaboration session comprises a plurality of devices or "participant devices," of which "attendee devices" are configured to view/receive content submitted or "shared" by "presenter devices." In some instances, the attendee devices are capable of modifying the content shared by the presenter device.

In particular, each participant (e.g., hosts/presenters and/or attendees) may operate a participant device 120. Each participant device 120 may comprise an electronic device with capability for visual and/or auditory presentation. Thus, a participant device 120 can be, for example, a desktop personal computer (PC), a laptop computer, a workstation, a personal digital assistant (PDA), a wireless telephone, a smart phone, an Internet television, and the like. Each participant device 120 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 110 such as, for example, the Internet, and may appear as a client computer thereon.

In one embodiment, each participant device 120 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the on-line, interactive meeting (a collaborative computing session), such as conventional web browser programs that allow convenient access and navigation of the Internet (e.g., the World Wide Web).

The on-line meeting (collaborative computing session) of the various participants may be supported by an interaction server 130 which may be maintained or operated by one or more of the participants and/or a third-party service provider. The interaction server 130 may be a computer system that is connected to network 110, and which may comprise and appear as one or more server computers thereon. Interaction server 130 may store information (e.g., content) and application modules which can be provided to the participant devices 120. In some embodiments, these application modules are downloadable to the participant devices 120 and may support various functions that may be required for an interactive meeting or collaborative effort among the participants. The participant devices 120 and the interaction server 130 may interact in a client/server architecture, which may provide high performance and security for a multi-participant collaborative environment.

Network 110 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
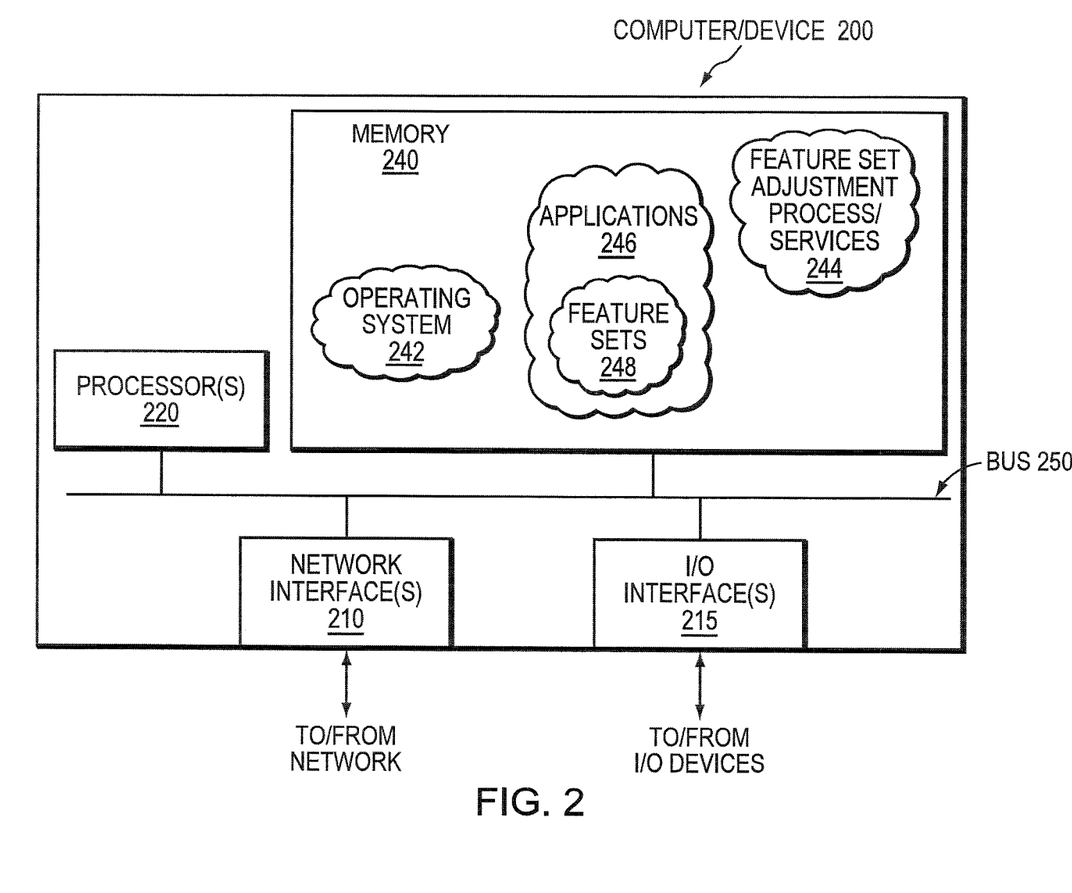
FIG. 2 illustrates an example device/computer.

FIG. 2 illustrates a schematic block diagram of an example device 200 that may be advantageously used with one or more embodiments described herein, e.g., as a participant device 120 or a server 130 for collaborative computing. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 110. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise one or more applications 246 having associated feature sets 248, and, as described herein, a feature set adjustment process/service 244. It will be apparent to those skilled in the art that other types of processors and memory, including various computer-readable media, may be used to store and execute program instructions pertaining to the inventive technique described herein, such as a web browser (not shown), known in the art.

Applications 246 may contain computer executable instructions executed by the processors 220 to generally perform functions to the associated applications, such as word processing, email, system applications (e.g., OS updates, system sounds, etc.), telephony applications (voice, video, etc.), as well as other conventional applications as will be understood by those skilled in the art. Also, applications 246 may comprise one or more applications (or modules) that may be directed to online collaborative sessions as described herein.

For example, with specific regard to online collaboration sessions, an activity manager may manage or control various processes or aspects during the course of an activity (e.g., on-line meeting or collaborative computing session) in which the participant (user) may interact with other users, e.g., in an activity session. In the context of on-line meetings, for example, the activity manager may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

Various functionality for supporting a collaborative computing session, such as an on-line meeting, may be provided by the one or more application code modules. These application code modules may be stored/maintained (e.g., by a cache) in memory 240, and may support, for example, basic communication framework, file sharing (e.g., for text, images, video, audio), user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VoIP) module, a question-answer (QA) module, a file transfer module, a presentation module, an application/desktop view/share module, and an Internet telephony module.

Illustratively, an application/desktop viewing/sharing module (an application 246) may provide functionality that allows participants to share single applications, multiple applications, or the entire desktop (as understood by those skilled in the art conventional application sharing techniques capture a predefined portion of the presenter's computer screen (e.g., the entire screen or a rectangle within the entire screen) and provide the image within the predefined portion of the presenter's computer screen to the viewer (e.g., "desktop sharing"). All of the applications that have windows positioned within the predefined portion of the presenter's computer screen are captured by the presenter's computer, transmitted to the viewer's computer, and displayed on the viewer's computer screen. By using "application sharing," however, particular application windows as selected by the presenter may be shared or not shared. For instance, a shared application window refers to a window belonging to an application that a presenter intends to share with a viewer, and the term non-shared application window refers to a window belonging to an application that a presenter does not intend to share with a viewer. (Note that references to a window are directed to an area utilized to display the content, and references to a desktop are directed to an entire portion of a display area of a corresponding device.) In either type of sharing, sounds may also be transmitted from the presenter device to the attendee device, such as those associated with particular applications (application sharing) or all system sounds (desktop sharing).

In addition, the video and/or VoIP modules (also not explicitly shown) may provide real-time video and/or voice/audio functionality to each participant to provide different functionality to each participant depending on the status and privileges of that participant. For example, for a participant who is a presenter, the modules may capture the video image from a video input device and/or audio from an audio input device, encode the data, and unicast the data to the other participants through the interaction server 130. For each participant that receives the data, the respective modules may decode the data and display/play the content. Thus, the video module may allow or enable various participants to join or exit a video session, edit video segments, or change a video presenter, while the VoIP module may allow or enable various participants to join or exit a VoIP session, pass the microphone to another participant, or display a volume window or control.

Other modules may also be performed to supply various functionality for online collaborative computing sessions, such as those mentioned above. Those skilled in the art may appreciate that the code modules and their respective functionalities are merely examples, and a participant device 120 may comprise additional or fewer code modules than those described above. As such, code modules may be added or removed per-functionality in order to support a collaborative computing session, whether those functions are needed or optional, and the specific code modules described herein are not meant to limit the scope of the embodiments described herein.

Also, where device 200 is a server 130 (or a collection of servers), applications 246 may comprise a number of processing facilities, including, for example, one or more of a web server, a log server, a ping server, a collaboration server, license manager, primary and secondary meeting managers, application servers (e.g. telephone agent, poll, chat, video, voice over IP, document view, application share, file share, etc.) may be integrated with a number of data storage facilities, such as, for example, a web database and a meeting database to implement a system for online collaborative meetings.

Dynamically Adjusted Feature Sets

As noted above, a user's status generally indicates a current online "situation" of the user, for instance, whether the user is available, busy, requesting to not be disturbed, etc. Typically, this status is manually adjusted/selected by the user for the sole purpose of informing other users of the particular user's availability/situation. Certain systems may also dynamically adjust the status indicator based on activity of the user, e.g., to "busy" when engaged in an activity, or to "away from keyboard" if inactive for some period of time. However, these adjusted status indicators are solely to inform other users of the particular user's availability/situation.

According to embodiments of the disclosure, therefore, novel techniques may be used to change or adjust a function/feature set of one or more applications of a user based on that user's status in other applications. For example, if the user is hosting an online collaboration session and sharing a desktop, email popups, instant messaging messages, and systems sounds may each be suppressed.

Illustratively, certain techniques described herein may be performed by a feature set adjustment process 244, which may contain computer executable instructions executed by the processor(s) 220 to generally perform functions to monitor applications 246 on a computer, each application having an associated feature set 248. Operationally, that is, one or more applications 246 may be executed on a computer (e.g., user computer 120), where certain applications have an associated feature set 248. A feature set, as described herein and as may be appreciated by those skilled in the art, generally comprises a set of actions that may be performed, dynamically by the application or manually by the user, such as events that may occur or be caused (e.g., various images or s messages appearing, sounds "playing," etc.). Example applications may comprise an online collaboration session application, email applications, music applications, instant messaging (IM) applications, chat applications, computer-based phone applications, and computer system applications, each with associated feature sets (e.g., sounds, popup messages, etc.) as will be appreciated by those skilled in the art.

According to the techniques described herein, feature set adjustment process 244 may determine a user status of a particular application. For example, assume that the particular application is an online collaboration session application, where a user's status may illustratively be online, busy, in a meeting, hosting a meeting, on a voice call, in a video conference, sharing a desktop, and requesting to not be disturbed. (Note that the use of an online collaboration session is not meant to be limiting to the scope of the embodiments herein, and is merely for an example for the benefit of the reader.) The particular application may comprise one or more features of its own, such as sharing images, sharing audio/sounds, sharing documents, etc. As such, the user status of the particular application may be as simple as having the application open (e.g., a video conference) or more advanced such as having a particular feature activated (e.g., sharing audio while in a particular application that does more than just share audio).

In response to the user status of that particular ("first") application, the feature set adjustment process 244 may dynamically adjust the feature set of at least one other ("second") application. For example, where the first application is sharing images (e.g., desktop sharing), then the feature set of the second application (and any others) may be adjusted to prevent other images from appearing (e.g., restricting popup notifications). Similarly, where the first application is sharing audio, then the feature set of the second application may be adjusted to mute audible sounds. (Note that audio and image sharing are merely representative examples.)

Figure 3A:
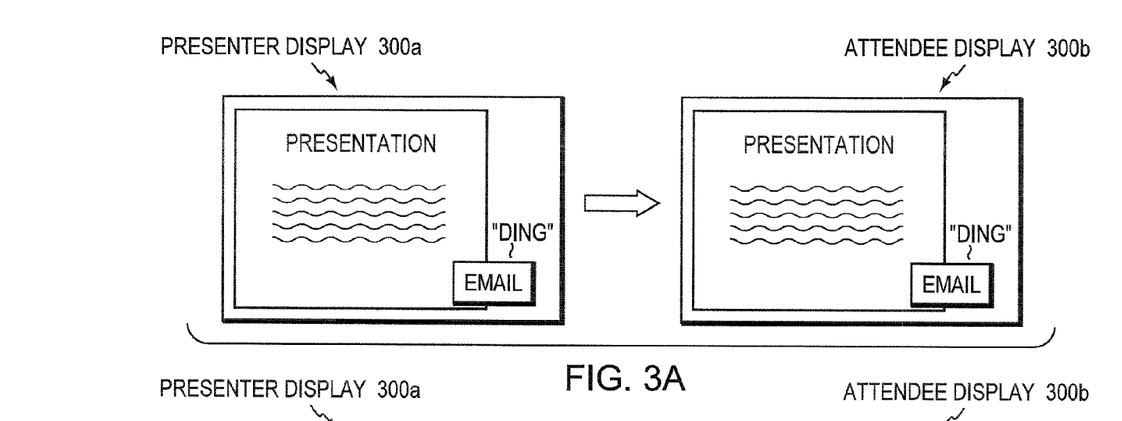
FIGS. 3A-B illustrate example displays/processes.
Figure 3B:
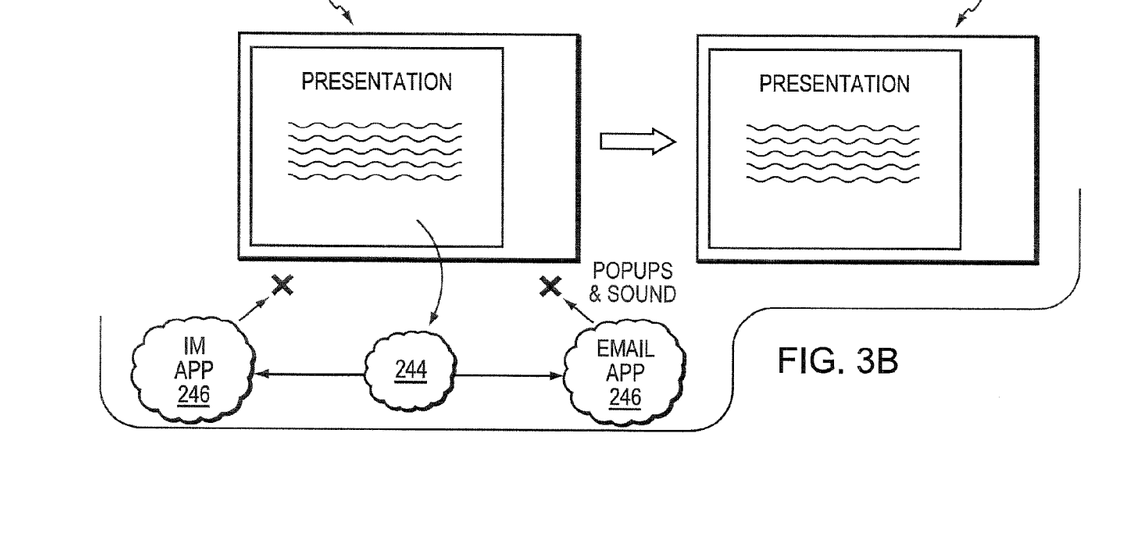

FIGS. 3A and 3B illustrate example displays (and logic) 300 in accordance with the techniques herein. For example, assume that a user A is sharing a desktop with attendees in an online collaborative computing session. Accordingly, user A is thus "busy" or "in a meeting," or more specifically, "hosting a meeting." As such, any other images or sounds that occur during desktop sharing will be transmitted to the attendees (such as an email popup notification and an associated sound, or "ding"), as shown in FIG. 3A. However, according to the techniques described herein, the system (process 244) dynamically prevents/limits certain events from occurring, such as preventing disturbing events, e.g., email popups, incoming IMs, calls, system sounds, etc., as shown in FIG. 3B Again, the applications and feature sets shown herein are merely representative examples, and are not meant to limit the scope of the embodiments herein. For instance, while a rich set of certain application status types have been described (e.g., in an application and using a particular feature of that application), other status indicators may be used in accordance with the techniques herein. For instance, certain other status types may be used, such as simply being on the phone. While this may be dynamically detected through computer-based phone applications, the simple manual selection by a user may advantageously provide the user with a manner in which feature sets of a plurality of applications may be adjusted accordingly (e.g., muting all disturbing system sounds, but not emergency/notification sounds).

In other words, the present system detects a user's activity within any appropriate application, dynamically changes the status (selected from a richer set of status options and indicators), and changes any related/corresponding function sets of other applications, accordingly. Notably, which particular applications, status types, and feature sets that are affected and how they are affected may be configured by program developers, system administrators, or dynamic processes, as may be appreciated by those skilled in the art after a thorough reading of the teachings of the embodiments described herein, accordingly.

Figure 4:
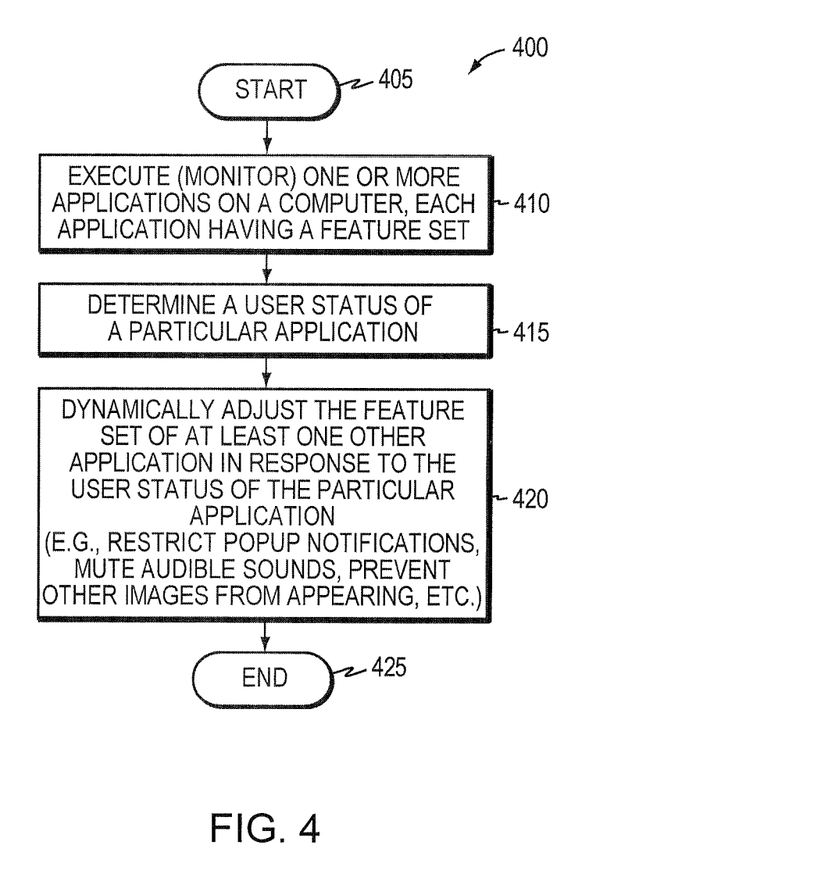
FIG. 4 illustrates an example procedure for dynamically adjusting feature sets of applications in response to user status of other applications on a computer.

FIG. 4 illustrates an example procedure for dynamically adjusting feature sets of applications in response to user status of other applications in accordance with one or more embodiments described herein. The procedure 400 starts at step 405, and continues to step 410, where one or more applications 246 may be executed (monitored) on a computer 200, each application having a feature set 248. As described in more detail above, in step 415, the feature set adjustment process 244 may determine a user status of a particular application (e.g., in a meeting, hosting a meeting, on a call, etc.). Accordingly, process 244 may dynamically adjust the feature set of at least one other application in step 420 in response to the user status of the particular application, such as, for example, restricting popup notifications (e.g., email), muting audible sounds (e.g., system sounds), preventing other images from appearing (e.g., update messages), etc. The procedure 400 ends in step 425, notably with the inherent ability to continually execute applications, determine updated user status for each of those applications, and dynamically adjust feature sets of other applications, as described herein.

Advantageously, the novel techniques described herein dynamically adjust feature sets of applications in response to user status of other applications on a computer. By dynamically adjusting the feature sets of other applications (not just those of the particular application), the novel techniques create a richer experience for users while computing. In particular, the techniques described above allow a user to perform certain tasks related to one application without worrying about being interrupted by another application, specifically based on the applications. For example, if working on a document, there is little need to prevent email popups from occurring. However, if sharing a desktop with attendees of an online collaboration session, it may be beneficial to suppress such popups, not only for the nuisance involved, but also since such popups may contain personal and/or embarrassing information. The techniques described above, therefore, dynamically adjust the feature sets in a manner that alleviates the need for a user to adjust the sets manually, and/or in a manner that is unavailable to the user as a manual adjustment.

While there have been shown and described illustrative embodiments that dynamically adjust feature sets of applications in response to user status of other applications on a computer, it is to be understood that various other adaptations and modifications may be made within the spirit and scope of the present invention. For example, the embodiments have been shown and described herein with certain status types (e.g., busy, in a meeting, etc.). However, the embodiments of the invention in their broader sense are not so limited, and may, in fact, be used with other status types, as may be appreciated by those skilled in the art. Additionally, certain actions/features have been noted (e.g., muting system sounds, preventing/hiding email popups, etc.), and such examples are also merely representative, and are not meant to limit the scope of the embodiments described herein. Moreover, the description above frequently uses online collaborative computing sessions as an example application from which status is obtained to alter the feature set of other applications. Online collaborative computing sessions are merely one example application having a status, and are not meant to limit the scope of the embodiments described herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:

executing a first application on a node in a computer network;

detecting, by the first application, a user's activity;

based on the user's activity detected by the first application, determining a type of user status from among a plurality of different types of possible user status;

determining one or more features of a feature set of a second application that correspond to the type of user status detected by the first application, the second application separate from the first application;

limiting the corresponding one or more features of the feature set of the second application to prevent the one or more features from interrupting the user's activity; and permitting one or more other features of the feature set of the second application that do not correspond to the type of user status detected by the first application.

2. The method of claim 1, wherein the user's activity is having a particular feature activated within the first application, the particular feature being one of a plurality of features of a feature set of the first application.

3. The method of claim 1, wherein the user's activity is having the first application open.

4. The method of claim 1, wherein the first application is an online collaboration session application and the user's activity is sharing audio within the online collaboration session application.

5. The method of claim 1, wherein the first application is an online collaboration session application and the user's activity is sharing a desktop.

6. The method of claim 1, wherein the corresponding one or more features of the feature set of the second application include popup notifications, and the limiting prevents the popup notifications.

7. The method of claim 1, wherein the corresponding one or more features of the feature set of the second application include audible sounds, and the limiting mutes the audible sounds.

8. The method of claim 1, further comprising:
executing the second application on the node in the computer network.

9. An apparatus, comprising:
a processor configured to execute one or more processes and applications; and
a memory configured to store
a first application that when executed by the processor is operable to detect a user's activity and, based on the user's activity, determine a type of user status for the first application from among a plurality of different types of possible user status;
a second application, the second application separate from the first application, and
a feature set adjustment process that when executed by the processor is operable to
determine one or more features of a feature set of the second application that correspond to the type of user status for the first application,
limit the corresponding one or more features of the feature set of the second application to prevent the one or more features from interrupting the user's activity, and
permit one or more other features of the feature set of the second application that do not correspond to the type of user status detected by the first application.

10. The apparatus of claim 9, wherein the user's activity is having a particular feature activated within the first application, the particular feature being one of a plurality of features of a feature set of the first application.

11. The apparatus of claim 9, wherein the user's activity is having the first application open.

12. The apparatus of claim 9, wherein the first application is an online collaboration session application and the user's activity is sharing audio within the online collaboration session application.

13. The apparatus of claim 9, wherein the first application is an online collaboration session application and the user's activity is sharing a desktop.

14. The apparatus of claim 9, wherein the corresponding one or more features of the feature set of the second application include popup notifications.

15. The apparatus of claim 9, wherein the corresponding one or more features of the feature set of the second application include audible sounds.

16. A non-transitory computer-readable media having software encoded thereon, the software when executed operable to:
determine a type of user status for a first application, from among a plurality of different types of user status possible for the first application, by monitoring for one or more activated features of a feature set of the first application;
determine one or more features of a feature set of a second application that correspond to the type of user status for the first application, the second application separate from the first application;
adjust the corresponding one or more features of the feature set of the second application to prevent conflict with the activated features of the feature set of the first application; and
permit absent adjustment one or more other features of the feature set of the second application that do not correspond to the type of user status for the first application.

17. The non-transitory computer-readable media of claim 16, wherein the first application is an online collaboration session application and the one or more features include sharing a desktop.

18. The non-transitory computer-readable media of claim 16, wherein the corresponding one or more features of the feature set of the second application include popup notifications, and the software that when executed is operable to adjust is operable to prevent the popup notifications.

19. The non-transitory computer-readable media of claim 16, wherein the corresponding one or more features of the feature set of the second application include audible sounds, and the software that when executed is operable to adjust is operable to mute the audible sounds.

20. The non-transitory computer-readable media of claim 16, wherein the first application and the second application are executed on a same node of a computer network.

* * * * *

UNITED STATES PATENT AND TRADEMARK OFFICE
CERTIFICATE OF CORRECTION

PATENT NO. : 8,412,819 B2
APPLICATION NO. : 13/476427
DATED : April 2, 2013
INVENTOR(S) : David Knight et al.

Page 1 of 1

It is certified that error appears in the above-identified patent and that said Letters Patent is hereby corrected as shown below:

In the Specification

In col. 6, line 35 should read:
events that may occur or be caused (e.g., various images or s Signed and Sealed this
Second Day of July, 2013

Teresa Stanek Rea
*Acting Director of the United States Patent and Trademark Office*